US012668457B2

(12) United States Patent
Vishal

(10) Patent No.: US 12,668,457 B2
(45) Date of Patent: Jun. 30, 2026

(54) SEAL ASSEMBLY FOR AN ELEVATOR CABIN AND A METHOD TO OPERATE THE SAME

(71) Applicant: Ruphavathy Vishal, Chennai (IN)

(72) Inventor: Ruphavathy Vishal, Chennai (IN)

(73) Assignee: Ruphavathy Vishal (IN)

(*) Notice: Subject to any disclaimer, the term of this patent is extended or adjusted under 35 U.S.C. 154(b) by 0 days.

(21) Appl. No.: 18/293,369

(22) PCT Filed: Jan. 25, 2024

(86) PCT No.: PCT/IB2024/050689
§ 371 (c)(1),
(2) Date: Jan. 30, 2024

(87) PCT Pub. No.: WO2025/056980
PCT Pub. Date: Mar. 20, 2025

(65) Prior Publication Data
US 2026/0167456 A1 Jun. 18, 2026

(30) Foreign Application Priority Data
Sep. 12, 2023 (IN) ............................ 202341061413

(51) Int. Cl.
*B66B 11/02* (2006.01)
*B66B 5/02* (2006.01)
(Continued)

(52) U.S. Cl.
CPC ................ *B66B 5/027* (2013.01); *B66B 9/00* (2013.01); *B66B 11/0206* (2013.01); *E21B 19/06* (2013.01); *E21B 19/07* (2013.01)

(58) Field of Classification Search
CPC ........... B66B 9/04; B66B 7/024; B66B 7/026
See application file for complete search history.

(56) References Cited

U.S. PATENT DOCUMENTS 2,927,661 A * 3/1960 Kristek .................... B66B 9/04 187/360
3,066,761 A * 12/1962 Behrens .................... B66B 5/18 187/400
(Continued)

FOREIGN PATENT DOCUMENTS

CN 203199847 U 9/2013
EP 3498651 A2 6/2019
(Continued)

*Primary Examiner* — Michael A Riegelman
(74) *Attorney, Agent, or Firm* — Jason C. Cameron

(57) ABSTRACT

A seal assembly 100 for an elevator cabin 220 of an elevator 200 is disclosed. The seal assembly includes a rubber seal 106 and a round soft foam extrusion 120. The rubber seal is coupled with a structural plate 108 which includes a bottom surface 110, a top surface 112, and an edge 114. The rubber seal is covered by means of a first mild carpet at the bottom surface and further includes a trapezoidal-shaped extruded bottom section for merging with the polycarbonate sheet 214. The rubber seal includes a U-shaped section 116 including a diverging bottom section. The round soft foam extrusion L-shaped tail structure encompassed in between top surface and the bottom surface, covered by the second mild carpet and is extended circumferentially between adjacent the U-shaped section of a plurality of guide rail pillars 213 along the top edge of the structural plate.

9 Claims, 6 Drawing Sheets

(51) Int. Cl.
*B66B 9/00* (2006.01)
*E21B 19/06* (2006.01)
*E21B 19/07* (2006.01)

(56) References Cited

U.S. PATENT DOCUMENTS

| | | | | |
|---|---|---|---|---|
| 3,949,953 | A * | 4/1976 | Hopkins | B65G 51/06 406/185 |
| 5,181,807 | A * | 1/1993 | Anders | B65G 51/06 406/190 |
| 5,447,211 | A * | 9/1995 | Sors | B66B 9/04 187/277 |
| 5,512,791 | A * | 4/1996 | Cho | H02K 41/02 187/250 |
| 5,583,326 | A * | 12/1996 | Sors | B66B 9/04 187/277 |
| 6,085,873 | A * | 7/2000 | Macchi | B65G 51/04 187/400 |
| 10,233,055 | B1 * | 3/2019 | Ascua | B66B 11/026 |
| 10,351,388 | B2 * | 7/2019 | Ascua | B66B 9/04 |
| 10,563,686 | B2 * | 2/2020 | Shehri | F16B 5/121 |
| 11,780,707 | B1 * | 10/2023 | de Ledebur | B66B 7/047 187/408 |
| 11,802,021 | B2 * | 10/2023 | Babu | B66B 7/026 |
| 11,814,267 | B2 * | 11/2023 | Babu | B66B 11/0226 |
| 11,834,297 | B1 * | 12/2023 | de Ledebur | F16J 15/3284 |
| 12,054,356 | B2 * | 8/2024 | Vishal | B66B 11/0226 |
| 12,110,208 | B2 * | 10/2024 | Alexanian | B66B 9/04 |
| 12,600,600 | B2 * | 4/2026 | Vishal | B66B 11/0226 |
| 2022/0009747 | A1 * | 1/2022 | Alexanian | B66B 9/04 |
| 2023/0136840 | A1 * | 5/2023 | Babu | B66B 11/004 187/250 |
| 2023/0192444 | A1 * | 6/2023 | Babu | B66B 9/04 |
| 2024/0228227 | A1 * | 7/2024 | Vishal | B66B 1/30 |
| 2024/0228233 | A1 * | 7/2024 | Vishal | B66B 9/04 |
| 2024/0253948 | A1 * | 8/2024 | Vishal | B66B 9/04 |
| 2025/0108997 | A1 * | 4/2025 | Vishal | B66B 11/0005 |
| 2025/0128911 | A1 * | 4/2025 | Vishal | B66B 5/06 |
| 2025/0313432 | A1 * | 10/2025 | Vishal | B66B 9/04 |
| 2025/0313433 | A1 * | 10/2025 | Vishal | B66B 11/0226 |
| 2025/0364820 | A1 * | 11/2025 | Vishal | B66B 7/00 |

FOREIGN PATENT DOCUMENTS

| | | | | |
|---|---|---|---|---|
| WO | 2021245536 | A1 | 12/2021 | |
| WO | WO-2022175730 | A1 * | 8/2022 | B66B 9/04 |
| WO | WO-2025114767 | A1 * | 6/2025 | B66B 11/0423 |

* cited by examiner

SEAL ASSEMBLY FOR AN ELEVATOR CABIN AND A METHOD TO OPERATE THE SAME

CROSS-REFERENCE TO RELATED APPLICATION

This application claims priority from a Complete Patent application filed in India having patent application No. 202341061413, filed on Sep. 12, 2023, and titled "A SEAL ASSEMBLY FOR AN ELEVATOR CABIN AND A METHOD TO OPERATE THE SAME" and a PCT Application No. PCT/IB2024/050689 filed on Jan. 25, 2024, and titled "A SEAL ASSEMBLY FOR AN ELEVATOR CABIN AND A METHOD TO OPERATE THE SAME."

FIELD OF INVENTION

Embodiments of the present disclosure relate to elevators and more particularly to a seal assembly for an elevator cabin and a method to operate the same.

BACKGROUND

An elevator moves in a vertical shaft to carry passengers or freight between the levels of a multi-story building. The pneumatic vacuum elevator uses air pressure to cause motion of the passenger cabin within a thoroughfare or tubular cylinder. The mechanism uses the air within the tubular cylinder as a working fluid. Brakes, motors, valves, electronic controls, and other equipment work in tandem to ensure a safe and pleasant riding experience for each occupant therein. In addition, the unnecessary braking of the elevator and speed-raising also increase the extra mechanical wear of the elevator, thereby have reduced the service life of the elevator. Various components of the elevator include a cabin, a controller, a sealing unit, and the like.

Sealing is an important equipment attached on top of a pneumatic vacuum elevator. The seal enables a frictionless movement and an easy elevation of the cabin due to the pneumatic depression generated on the upper part of the tubular cylinder. In operation, the elevator cabin undergoes a rough transition as the cabin moves from one location to another. Associated movement experiences vibration and air leakage as the elevator cabin transports. This vibration and air leakage prevents the smooth transportation of the elevator.

Although, the currently known sealing units or assemblies reduce air leakage during the movement of the cabin while sealing the cabin in an elevator cylinder. There is a need for a sealing unit that is simple and mounted easily in the elevators. There is a need for a sealing unit that provides tight sealing to the elevator.

Hence, there is a need for a seal assembly for an elevator cabin and a method to operate the same to address the aforementioned issue(s).

OBJECTIVE OF THE INVENTION

An objective of the present invention is to provide a seal assembly for a, elevator cabin.

Another objective of the present invention is to provide tight sealing by using a circumferential rubber seal arranged on the structural plate.

Yet, another objective of the present invention is to provide a smooth riding of the elevator cabin by avoiding air leakage during transportation of the elevator cabin.

Further, an objective of the present invention is to facilitate easy mounting of sealing material on the elevator cabin.

BRIEF DESCRIPTION

In accordance with an embodiment of the present disclosure, a seal assembly for an elevator cabin of an elevator is provided. The seal assembly includes a rubber seal and a round soft foam extrusion. The rubber seal is configured to couple with a structural plate of the elevator cabin. The structural plate includes a bottom surface, a top surface, and an edge for integrating the top surface with the bottom surface. The rubber seal includes a trapezoidal-shaped extruded bottom section and is configured to couple to a bottom surface of the structural plate. The trapezoidal-shaped extruded bottom section is configured to merge with the polycarbonate sheet of the elevator cylinder at a predetermined point. The rubber seal is covered by means of a first mild carpet. The rubber seal includes a U-shaped section including a diverging bottom section. The round soft foam extrusion is operatively coupled to an edge of the structural plate. The round soft foam extrusion with an L-shaped tail structure encompassed in between top surface and the bottom surface. The round soft foam extrusion is covered by a second mild carpet placed on the top surface of the structural plate. The round soft foam extrusion is extended circumferentially between adjacent the U-shaped section of a plurality of U-shaped sections of a plurality of guide rail pillars along the top edge of the structural plate to avoid air leakage for smooth traveling of the elevator. The round soft foam extrusion is configured to partially merge with the polycarbonate sheet.

In accordance with another embodiment of the present disclosure, a method for operating a seal assembly for the elevator is provided. The method includes providing, a rubber seal coupled with a structural plate of the elevator cabin wherein the structural plate, includes a bottom surface, a top surface, and an edge for integrating the top surface with the bottom surface. The method also includes merging, the trapezoidal-shaped extruded bottom section with the polycarbonate sheet of the elevator cylinder at a predetermined point. Further, the method includes covering, the rubber seal by means of a first mild carpet. Furthermore, the method includes providing, a trapezoidal-shaped extruded bottom section coupled to a bottom surface of the structural plate. Furthermore, the method includes providing, a U-shaped section of a plurality of U-shaped sections with a diverging bottom section. Furthermore, the method includes providing, a round soft foam extrusion with an L-shaped tail structure encompassed in between top surface and the bottom surface. Furthermore, the method includes covering, the round soft foam extrusion by a second mild carpet placed on the top surface of the structural plate. Furthermore, the method includes avoiding, air leakage for smooth traveling of the elevator by means of a round soft foam extrusion extended circumferentially between adjacent the U-shaped section of a plurality of U-shaped sections of a plurality of guide rail pillars along the top edge of the structural plate. Furthermore, the method includes partially merging, the round soft foam extrusion with the polycarbonate sheet.

In accordance with yet another embodiment of the present disclosure, a pneumatic vacuum is provided. The pneumatic vacuum elevator includes an external cylinder assembly, a guide rail pillar, a polycarbonate sheet, a seal assembly, and an electronic control unit. The external cylindrical assembly includes an elevator cabin inserted therein, wherein the external cylinder assembly further includes a plurality of cylinders coupled using a base ring assembly and a band ring assembly. The guide rail pillar is mechanically coupled to the elevator cabin. The guide rail pillar is disposed at the external cylinder assembly. The guide rail pillar is configured to guide an actuation of the elevator cabin. The polycarbonate sheet is configured to cover the external cylinder assembly. The polycarbonate sheet and the external cylinder assembly is coupled using a first locking device and a second locking device. The first locking device is configured to lock an air gap between the polycarbonate sheet, the base ring assembly, and the external cylinder assembly and the second locking device is configured to lock an air gap between the polycarbonate sheet and the guide rail pillar a seal assembly adapted to fit over a top portion of the elevator cabin. The seal assembly is configured to seal the elevator cabin to reduce vibrations during the upward and downward movement of the elevator cabin. The seal assembly includes a rubber seal configured to couple with a structural plate, wherein the rubber seal is covered by means of a mild carpet. The rubber seal includes a trapezoidal-shaped extruded bottom section and is configured to couple to a bottom part of the structural plate. The trapezoidal-shaped extruded bottom section is configured to merge with the polycarbonate sheet of the elevator cylinder at a predetermined point. The rubber seal is covered by means of a first mild carpet. The round soft foam extrusion with an L-shaped tail structure encompassed in between top surface and the bottom surface. The round soft foam extrusion is covered by a second mild carpet placed on the top surface of the structural plate. The round soft foam extrusion is extended circumferentially between adjacent the U-shaped section of a plurality of U-shaped sections of a plurality of guide rail pillars along the top edge of the structural plate to avoid air leakage for smooth traveling of the elevator. The round soft foam extrusion is configured to partially merge with the polycarbonate sheet.

To further clarify the advantages and features of the present disclosure, a more particular description of the disclosure will follow by reference to specific embodiments thereof, which are illustrated in the appended figures. It is to be appreciated that these figures depict only typical embodiments of the disclosure and are therefore not to be considered limiting in scope. The disclosure will be described and explained with additional specificity and detail with the appended figures.

BRIEF DESCRIPTION OF THE DRAWINGS

The disclosure will be described and explained with additional specificity and detail with the accompanying figures in which.

Figure 1:
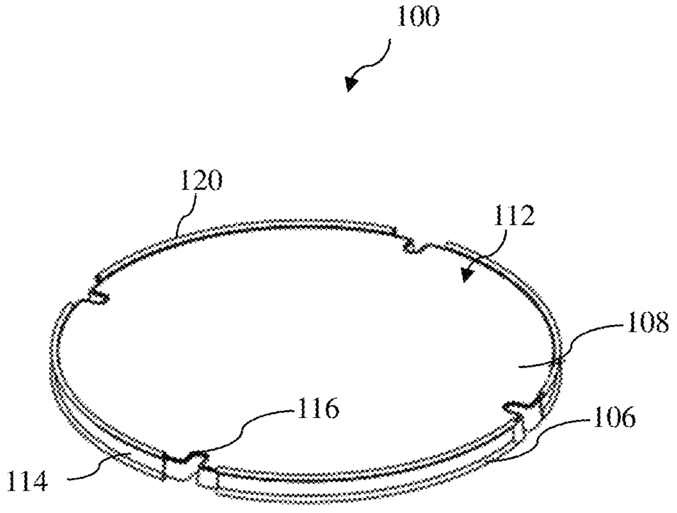
FIG. 1 is a schematic representation of an isometric view of a seal assembly for an elevator cabin in accordance with an embodiment of the present disclosure.

Further, those skilled in the art will appreciate that elements in the figures are illustrated for simplicity and may not have necessarily been drawn to scale. Furthermore, in terms of the construction of the device, one or more components of the device may have been represented in the figures by conventional symbols, and the figures may show only those specific details that are pertinent to understanding the embodiments of the present disclosure so as not to obscure the figures with details that will be readily apparent to those skilled in the art having the benefit of the description herein.

DETAILED DESCRIPTION

For the purpose of promoting an understanding of the principles of the disclosure, reference will now be made to the embodiment illustrated in the figures and specific language will be used to describe them. It will nevertheless be understood that no limitation of the scope of the disclosure is thereby intended. Such alterations and further modifications in the illustrated system, and such further applications of the principles of the disclosure as would normally occur to those skilled in the art are to be construed as being within the scope of the present disclosure.

The terms "comprises", "comprising", or any other variations thereof, are intended to cover a non-exclusive inclusion, such that a process or method that comprises a list of steps does not include only those steps but may include other steps not expressly listed or inherent to such a process or method. Similarly, one or more devices or sub-systems or elements or structures or components preceded by "comprises . . . a" does not, without more constraints, preclude the existence of other devices, sub-systems, elements, structures, components, additional devices, additional sub-systems, additional elements, additional structures or additional components. Appearances of the phrase "in an embodiment", "in another embodiment" and similar language throughout this specification may, but not necessarily do, all refer to the same embodiment.

Unless otherwise defined, all technical and scientific terms used herein have the same meaning as commonly understood by those skilled in the art to which this disclosure belongs. The system, methods, and examples provided herein are only illustrative and not intended to be limiting.

In the following specification and the claims, reference will be made to a number of terms, which shall be defined to have the following meanings. The singular forms "a", "an", and "the" include plural references unless the context clearly dictates otherwise.

Embodiments of the present disclosure relate to a seal assembly for an elevator cabin of an elevator. The seal assembly includes a rubber seal and a round soft foam extrusion. The rubber seal is configured to couple with a structural plate of the elevator cabin. The structural plate includes a bottom surface, a top surface, and an edge for integrating the top surface with the bottom surface. The rubber seal is covered by means of a mild carpet. The rubber seal includes a trapezoidal-shaped extruded bottom section and is configured to couple to a bottom surface of the structural plate. The trapezoidal-shaped extruded bottom section is configured to merge with the polycarbonate sheet of the elevator cylinder at a predetermined point. The rubber seal is covered by means of a first mild carpet. The rubber seal includes a U-shaped section including a diverging bottom section. The round soft foam extrusion is operatively coupled to an edge of the structural plate. The round soft foam extrusion with an L-shaped tail structure encompassed in between top surface and the bottom surface. The round soft foam extrusion is covered by a second mild carpet placed on the top surface of the structural plate. The round soft foam extrusion is extended circumferentially between adjacent the U-shaped section of a plurality of U-shaped sections of a plurality of guide rail pillars along the top edge of the structural plate to avoid air leakage for smooth traveling of the elevator. The round soft foam extrusion is configured to partially merge with the polycarbonate sheet.

In the discussion that follows, references will be made to “first mild carpet” and, “second mild carpet” with reference to the position on the bottom surface and top surface of the structural plate respectively.

FIG. 1 is a schematic representation of a seal assembly 100 in accordance with an embodiment of the present disclosure. The seal assembly 100 includes a rubber seal 106, and a round soft foam extrusion 120. The rubber seal 106 is configured to couple with a structural plate 108 of the elevator cabin 220 (shown in FIG. 6). The structural plate 108 includes a bottom surface 110 (Shown in FIG. 3), a top surface 112, and an edge 114 for integrating the top surface 112 with the bottom surface 110. The rubber seal 106 is covered by means of a first mild carpet. The rubber seal 106 includes a trapezoidal-shaped extruded bottom section and is configured to couple to a bottom surface 110 of the structural plate 108. The rubber seal 106 is covered by means of a first mild carpet.

In one embodiment, the rubber seal 106 is circumferentially extended between the adjacent U-section 116 of the plurality of guide rail pillars 213. In another embodiment, the rubber seal 106 helps to seal off the elevator cabin 220 and an external cylinder of the elevator to provide an airtight barrier for resisting loss of air. Yet, in another embodiment, the rubber seal 106 is manufactured by a moulding process using silicon rubber.

The round soft foam extrusion 120 is operatively coupled to the edge 114 of the structural plate 108. The round soft foam extrusion 120 is with an L-shaped tail structure encompassed in between top surface 112 and the bottom surface 110. The round soft foam extrusion 120 is covered by a second mild carpet placed on the top surface 112 of the structural plate 108. The round soft foam extrusion 120 is extended circumferentially between adjacent the U-shaped section 116 of a plurality of U-shaped sections of a plurality of guide rail pillars 213 (Shown in FIG. 4*a*) along the top edge of the structural plate to avoid air leakage for smooth traveling of the elevator. The round soft foam extrusion 120 is configured to partially merge with a polycarbonate sheet 214 (shown in FIG. 7).

In one embodiment, the round soft foam extrusion 120 is fixed but at position to be touched to the sheet. The round soft foam extrusion 120 is made of soft material and may be compressible at the time of movement of the elevator cabin 220.

Figure 2:
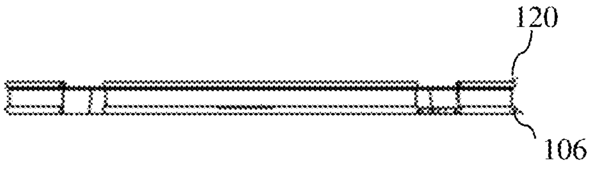
FIG. 2 is a schematic representation of a front view of the seal assembly for an elevator of FIG. 1 in accordance with an embodiment of the present disclosure.
Figure 3:
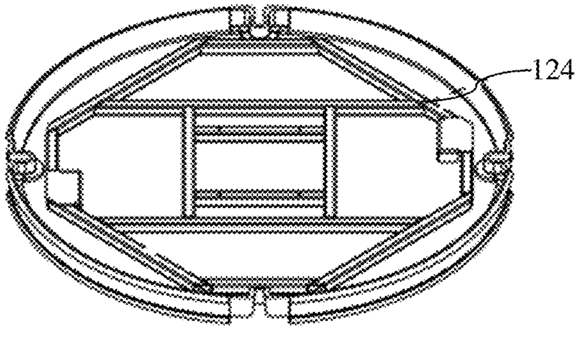
FIG. 3 is a schematic representation of an isometric view of a bottom surface of the seal assembly of FIG. 1 in accordance with an embodiment of the present disclosure.

FIG. 2 is a schematic representation of a front view of the seal assembly 100 for an elevator of FIG. 1 in accordance with an embodiment of the present disclosure. FIG. 3 is a schematic representation of an isometric view of the bottom surface 110 of the seal assembly 100 of FIG. 1 in accordance with an embodiment of the present disclosure. In one embodiment, the bottom surface 110 includes a rib structure 124. The rib structure 124 is configured for supporting & levelling the seal assembly 100.

Figure 4A:
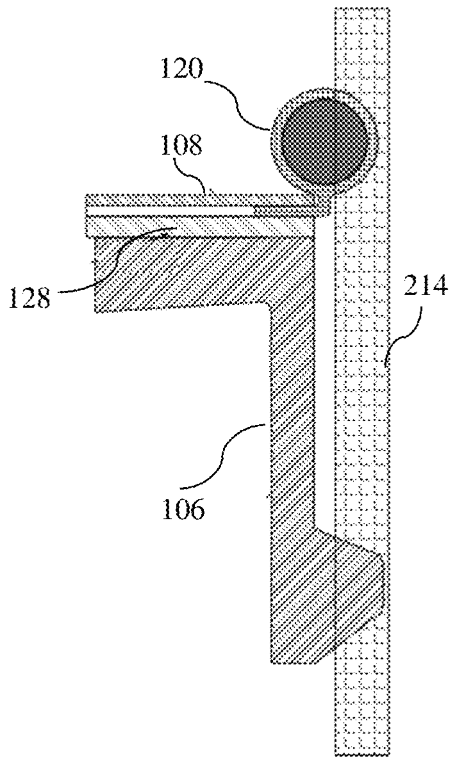
FIG. 4*a* is a schematic representation of a cross-sectional view of a rubber seal arc middle portion of an elevator cabin with the seal assembly of FIG. 1 in accordance with an embodiment of the present disclosure.

FIG. 4*a* is a schematic representation of a cross-sectional view of a rubber seal 106 arc middle portion of an elevator cabin with the seal assembly of FIG. 1 in accordance with an embodiment of the present disclosure. In one embodiment, the seal assembly 100 includes a main plate 128. In one embodiment, the poly carbonate sheet 214 of the elevator cabin is merged with the rubber seal 106 in a half round shape.

Figure 4B:
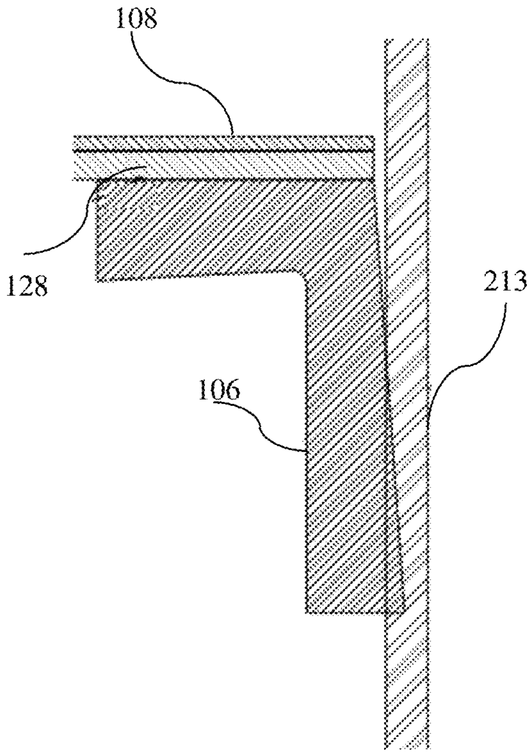
FIG. 4*b* is a schematic representation of a cross-section view of an exemplary embodiment of the rubber seal at a U-shape of a guide rail pillar of FIG. 1 in accordance with an embodiment of the present disclosure.

FIG. 4*b* is a schematic representation of a cross-section view of an exemplary embodiment of the rubber seal 106 at a U-shape of a guide rail pillar of FIG. 1 in accordance with an embodiment of the present disclosure. In one embodiment, the main plate 128 of seal assembly is merged with the rubber seal 106. The merging is with U shape of guide rail pillar 213.

Figure 5:
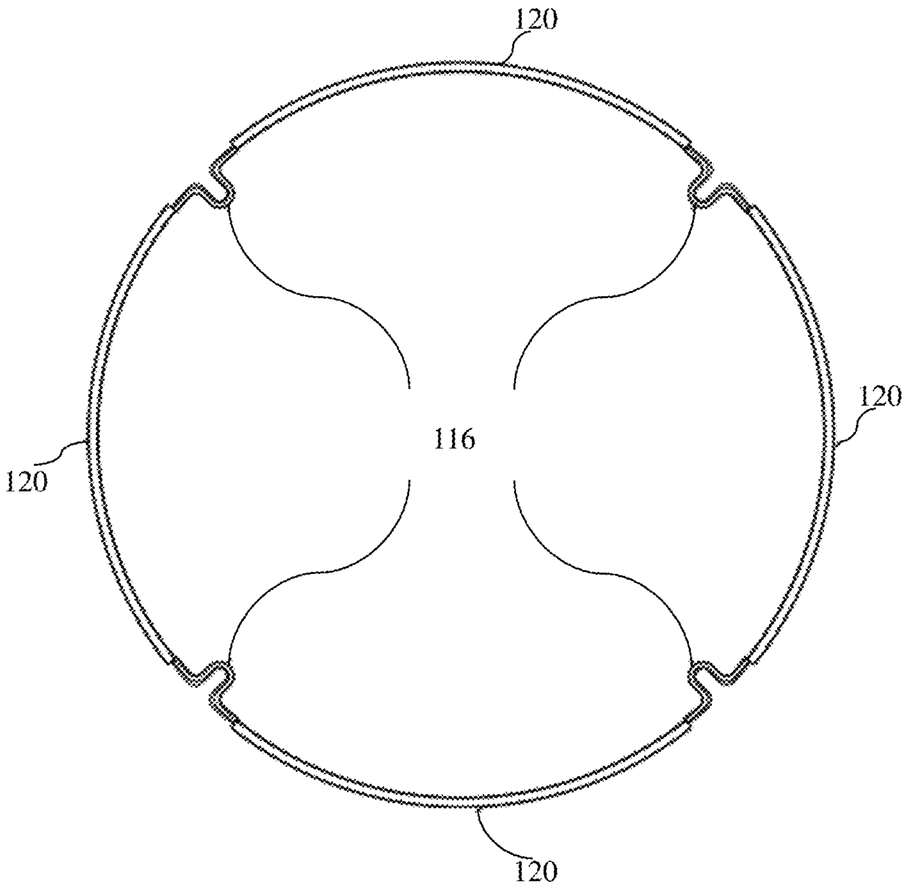
FIG. 5 is a schematic representation of a top view of the seal assembly of FIG. 1 in accordance with an embodiment of the present disclosure.

FIG. 5 is a schematic representation of a top view of the seal assembly of FIG. 1 in accordance with an embodiment of the present disclosure. In one embodiment, the U-shaped section 116 is operatively coupled with a guide pillar of the plurality of guide pillars. In one embodiment, the round soft foam extrusion 120 is covered by a mild carpet. One of the round soft extrusions 120 is placed on the top of the structural plate 108 and another one is placed at U shape of seal rubber mold in guide rail pillar location.

Figure 6:
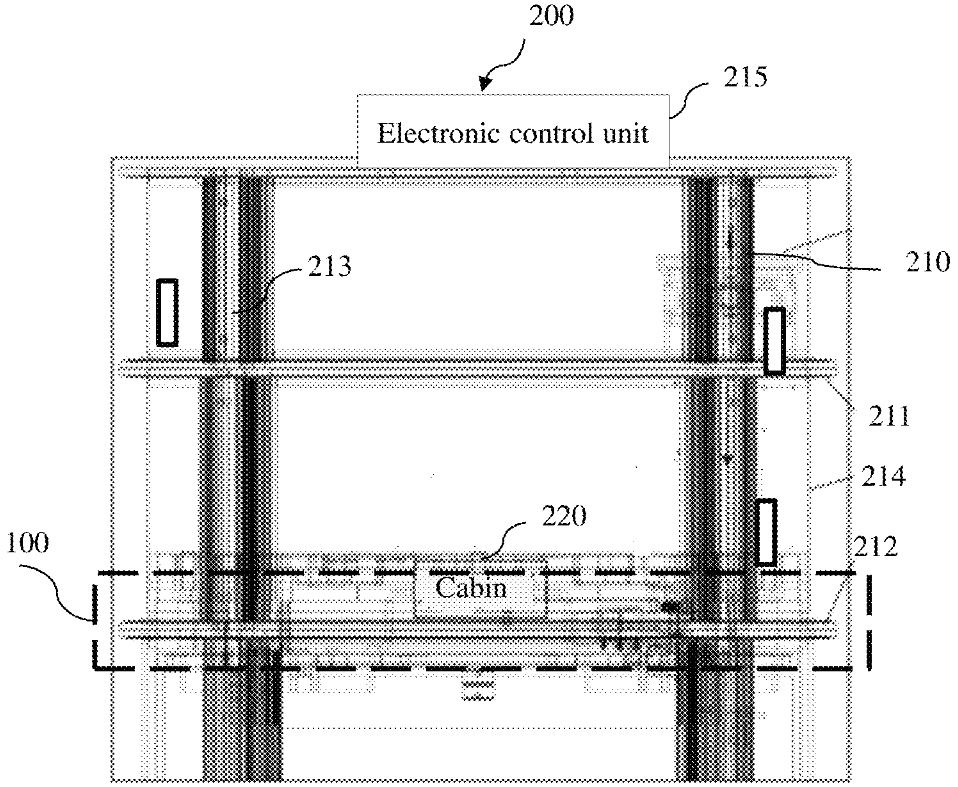
FIG. 6 is a schematic representation of a pneumatic vacuum elevator in accordance with an embodiment of the present disclosure.

FIG. 6 is a schematic representation of a seal assembly 100 corresponding to the pneumatic vacuum elevator 200 in accordance with an embodiment of the present disclosure. The elevator 200 includes an external cylinder assembly 210 including an elevator cabin 220 inserted therein. The elevator cabin 220 carries one or more users between one or more levels of a structure. In one embodiment, the structure may include a building, vessel, or the like.

The external cylinder assembly 210 includes a plurality of cylinders coupled using a base ring assembly 211 and a band ring assembly 212. The base ring assembly 211 provides a supporting layer between other external cylinder assemblies which are connected above or below the top surface 112 and the bottom surface of the external cylinder assembly 210 coupled with the base ring and as a result enables the extension of height pneumatic vacuum elevator based on the requirement. The base ring 211 act as a connecting device for coupling one or more components of the pneumatic vacuum elevator 200 such as the vertical guide rail fitment and the external cylinder assembly for the formation of a compact integrated structure of the pneumatic vacuum elevator. Further, the external cylinder assembly has a band (outer) ring 212 that is used to intact both top and bottom side of the base ring. The band ring 212 is the maximum diameter part in the pneumatic vacuum elevator.

Furthermore, the pneumatic vacuum elevator 200 includes a guide rail pillar 213 mechanically coupled to the elevator cabin 220. The guide rail pillar is disposed at the external cylinder assembly. The guide rail pillar 213 is configured to guide an actuation of the elevator cabin 220. The guide rail pillar 213 guides support of the cabin movement in upper and lower side without causing friction and thus reduces anxiety of the passenger within the elevator. The guide rail pillar 213 connects the base ring and provides more strength and rigidity to shaft of the pneumatic vacuum elevator 200. In addition, the pneumatic vacuum elevator 200 includes a polycarbonate sheet 214 configured to cover the external cylinder assembly 210.

The polycarbonate sheet 214 and the external cylinder assembly is coupled using a first locking device and a second locking device. The first locking device is configured to lock an air gap between the polycarbonate 214 sheet, the base ring assembly, and the external cylinder assembly. The first locking device (not shown in FIG. 7) acts as a tight lock or a hindrance between the base ring and the top and bottom surface 110 (not shown in FIG. 7) of the vertical pillar so that the vertical pillar is constant at its respective position for providing vertical support for smooth functioning of the pneumatic vacuum elevator 200 and moreover reduces the air gap so that any abnormality or distortion during the operation of the pneumatic vacuum elevator 200 is avoided.

The second locking device (not shown in FIG. 5) is configured to lock the air gap between the polycarbonate sheet 214 and the guide rail pillar. The second locking device helps in providing the locking mechanism to the guide rail by avoiding the formation of the air gap which not only keeps the guide rail in an intact position but also does not affect the smooth functioning of the guide rail in guiding the actuation of the cabin of the pneumatic vacuum elevator for transiting. Further, the pneumatic vacuum elevator 200 includes a seal assembly 215 adapted to fit over a top portion of the elevator cabin 220. The seal assembly 100 is configured to seal the elevator cabin 220 to avoid air leakage during the upward and downward movement of the elevator cabin 220 for enabling smooth transportation of the elevator. The seal assembly 100 includes a rubber seal 106, and a round soft foam extrusion 120. The rubber seal 106 is configured to couple with a structural plate 108 of the elevator cabin 220. The structural plate 108 includes a bottom surface 110, a top surface 112, and an edge 114 for integrating the top surface 112 with the bottom surface 110. The rubber seal 106 is covered by means of a mild carpet. The rubber seal 106 includes a trapezoidal-shaped extruded bottom section and is configured to couple to a bottom surface 110 of the structural plate 108. The trapezoidal-shaped extruded bottom section is configured to merge with a polycarbonate sheet 214 of the elevator cabin 220 at a predetermined point. The rubber seal 106 includes a U-shaped section 116 including a diverging bottom section.

The round soft foam extrusion 120 is operatively coupled to the edge 114 of the structural plate 108. The round soft foam extrusion 120 with an L-shaped tail structure encompassed in between top surface and the bottom surface 110. The round soft foam extrusion 120 is covered by a second mild carpet placed on the top surface. The round soft foam extrusion 120 is extended circumferentially between adjacent the U-shaped section 116 of a plurality of guide rail pillars 213 (Shown in FIG. 4*a* and FIG. 4*b*) along the top edge of the structural plate 108 to avoid air leakage for smooth traveling of the elevator 200. The round soft foam extrusion (120) is configured to partially merge with the polycarbonate sheet.

The elevator 200 also includes an electronic control unit 215 located on an external cylinder assembly 210 of the pneumatic vacuum elevator 200. In one embodiment, the electronic control unit 215 controls the movement of the elevator 200.

Figure 7:
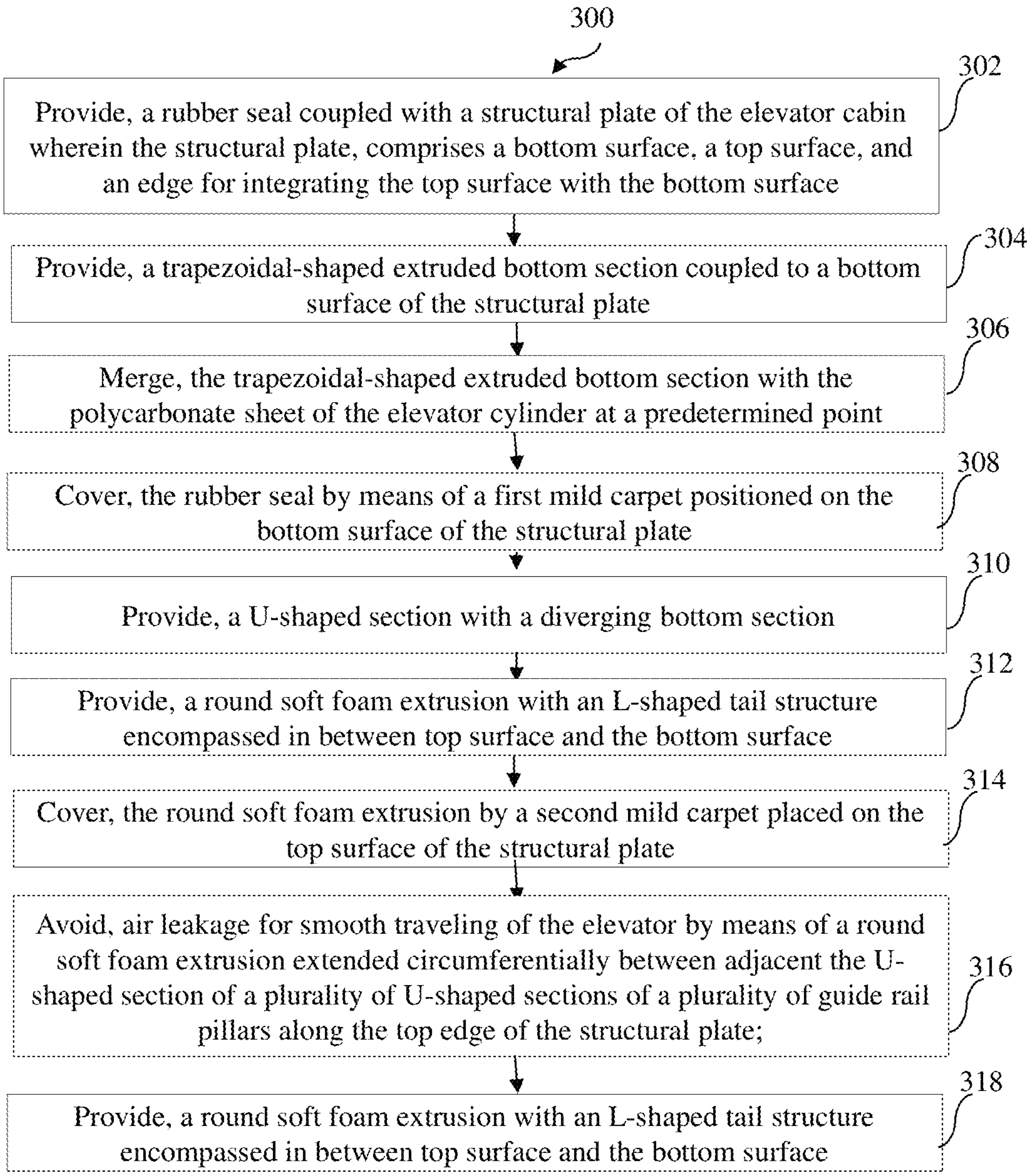
FIG. 7 is a flow chart representing the steps involved in a method for operating a seal assembly of the elevator in accordance with an embodiment of the present disclosure.

FIG. 7 is a flow chart representing the steps involved in a method 300 to operate the elevator cabin with the seal assembly in accordance with an embodiment of the present disclosure. The method 300 includes providing, a rubber seal coupled with a structural plate of the elevator cabin wherein the structural plate, includes a bottom surface, a top surface, and an edge for integrating the top surface with the bottom surface in step 302. The method also includes attaching, the structural plate to a top portion of an elevator cabin lateral surface and a first rubber seal component bumper attached to the edge of the structural plate. The first rubber seal component bumper impacts an internal surface of an elevator channel.

Further, the method 300 includes providing, a trapezoidal-shaped extruded bottom section coupled to a bottom surface of the structural plate in step 304. The method also includes providing, a rib structure positioned at the bottom side of the structural plate, wherein the rim structure is configured for supporting & levelling of the seal assembly.

Furthermore, the method 300 includes merging, the trapezoidal-shaped extruded bottom section with the polycarbonate sheet of the elevator cylinder at a predetermined point in step 306.

The method 300 also includes covering, the rubber seal by means of a first mild carpet in step 308. The method also includes extending, the rubber seal between the adjacent U-section of the plurality of guide rail pillars. The method also includes sealing, the elevator cabin, and an external cylinder of the elevator to provide an airtight barrier for resisting loss of air. The method also includes moulding, the silicon rubber for manufacturing the rubber seal.

Furthermore, the method 300 includes providing, a U-shaped section with a diverging bottom section in step 310. The method also includes coupling, the U-shaped section with a guide pillar of the plurality of guide pillars.

Furthermore, the method 300 includes providing, a round soft foam extrusion with an L-shaped tail structure encompassed in between top surface and the bottom surface in step 312.

Furthermore, the method 300 includes covering, the round soft foam extrusion by a second mild carpet placed on the top surface of the structural plate in step 314.

Furthermore, the method 300 includes avoiding, air leakage for smooth traveling of the elevator by means of a round soft foam extrusion extended circumferentially between adjacent the U-shaped section of a plurality of U-shaped sections of a plurality of guide rail pillars along the top edge of the structural plate in step 316.

Furthermore, the method 300 includes partially merging, the round soft foam extrusion with the polycarbonate sheet in step 318.

Various embodiments of the system and method to operate the seal assembly for the elevator described above enable a simple assembly. The seal assembly disclosed in the present disclosure provide a tight sealing by using a circumferential rubber seal arranged on the structural plate. The seal assembly disclosed in the present disclosure is incorporated into the controls of the elevator systems to provide a smooth riding of the elevator cabin by avoiding air leakage during transportation of the elevator cabin. The seal assembly in the present disclosure provides easy mounting of sealing material on the elevator cabin. The seal assembly helps to clean the shaft area of the elevator cabin by using the round soft foam extrusion.

Furthermore, there is no intention to be bound by any expressed or implied theory presented in the preceding technical field, background, brief summary, or detailed description. It is also to be understood that the specific devices and processes illustrated in the attached drawings, and described in the specification, are simply exemplary embodiments of the inventive concepts defined in the appended claims. Hence, specific dimensions and other physical characteristics relating to the embodiments disclosed herein are not to be considered as limiting, unless the claims expressly state otherwise.

While specific language has been used to describe the disclosure, any limitations arising on account of the same are not intended. As would be apparent to a person skilled in the art, various working modifications may be made to the method 250 in order to implement the inventive concept as taught herein.

The figures and the foregoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, the order of processes described herein may be changed and are not limited to the manner described herein. Moreover, the actions of any flow diagram need not be implemented in the order shown; nor do all of the acts need to be necessarily performed. Also, those acts that are not dependent on other acts may be performed in parallel with the other acts. The scope of embodiments is by no means limited by these specific examples.

I claim:

1. A seal assembly 100 for an elevator cabin 220 of an elevator 200 comprises:

a rubber seal 106 configured to couple with a structural plate 108 of the elevator cabin 220 wherein the structural plate 108, comprises a bottom surface 110, a top surface 112, and an edge 114 for integrating the top surface 112 with the bottom surface 110, wherein the rubber seal 106 comprises a trapezoidal-shaped extruded bottom section and is configured to couple to a bottom surface 110 of the structural plate 108, wherein, the trapezoidal-shaped extruded bottom section is configured to merge with a polycarbonate sheet 214 of the elevator cabin 220 at a predetermined point, wherein the rubber seal 106 is covered by means of a first mild carpet positioned on the bottom surface 110 of the structural plate 108, and wherein the rubber seal 106 comprises a U-shaped section 116 comprising a diverging bottom section;

a round soft foam extrusion 120 with an L-shaped tail structure encompassed in between top surface 112 and the bottom surface 110, wherein the round soft foam extrusion 120 is covered by a second mild carpet placed on the top surface 112 of the structural plate 108, wherein the round soft foam extrusion 120 is extended circumferentially between adjacent the U-shaped section 116 of a plurality of U-shaped sections of a plurality of guide rail pillars 213 along the top edge of the structural plate 108 to avoid air leakage for smooth traveling of the elevator 200, and wherein round soft foam extrusion 120 is configured to partially merge with the polycarbonate sheet 214.

2. The seal assembly 100 as claimed in claim 1, wherein the rubber seal 106 is circumferentially extended between the adjacent U-section 116 of the plurality of guide rail pillars 213.

3. The seal assembly 100 as claimed in claim 1, wherein the rubber seal 106 helps to seal off the elevator cabin 220 and an external cylinder of the elevator to provide an airtight barrier for resisting loss of air.

4. The seal assembly 100 as claimed in claim 1, wherein the structural plate 108 of the elevator cabin 220 is attached to a top portion of an elevator cabin 220 lateral surface and a first rubber seal component bumper attached to the edge 114 of the structural plate 108, wherein the first rubber seal component bumper impacts an internal surface of an elevator channel.

5. The seal assembly 100 as claimed in claim 1, wherein the rubber seal 106 is manufactured by a moulding process using silicon rubber.

6. The seal assembly 100 as claimed in claim 1, wherein the U-shaped section 116 is operatively coupled with a guide pillar of the plurality of guide pillars.

7. The seal assembly 100 as claimed in claim 1, comprises a rib structure 124 positioned at the bottom side of the structural plate 108, wherein the rim structure is configured for supporting & levelling of the seal assembly.

8. A method 300 comprising:

providing, a rubber seal coupled with a structural plate of the elevator cabin wherein the structural plate, comprises a bottom surface, a top surface, and an edge for integrating the top surface with the bottom surface; 302 providing, a trapezoidal-shaped extruded bottom section coupled to a bottom surface of the structural plate; 304 merging, the trapezoidal-shaped extruded bottom section with the polycarbonate sheet of the elevator cylinder at a predetermined point; 306 covering, the rubber seal by means of a first mild carpet positioned on the bottom surface of the structural plate; 308 providing, a U-shaped section with a diverging bottom section; 310 providing, a round soft foam extrusion with an L-shaped tail structure encompassed in between top surface and the bottom surface; 312 covering, the round soft foam extrusion by a second mild carpet placed on the top surface of the structural plate; 314 avoiding, air leakage for smooth traveling of the elevator by means of a round soft foam extrusion extended circumferentially between adjacent the U-shaped section of a plurality of U-shaped sections of a plurality of guide rail pillars along the top edge of the structural plate; 316 partially merging, the round soft foam extrusion with the polycarbonate sheet 318.

9. A pneumatic vacuum elevator 200 comprising:

an external cylinder assembly 210 comprising an elevator cabin 220 inserted therein, wherein the external cylinder assembly 210 comprises a plurality of cylinders coupled using a base ring assembly 211 and a band ring assembly 212;

a guide rail pillar 213 mechanically coupled to the elevator cabin 220, wherein the guide rail pillar 213 is disposed at the external cylinder assembly 210, wherein the guide rail pillar 213 is configured to guide an actuation of the elevator cabin 220;

a polycarbonate sheet 214 configured to cover the external cylinder assembly 210, wherein the polycarbonate sheet 214 and the external cylinder assembly 210 is coupled using a first locking device and a second locking device, wherein the first locking device is configured to lock an air gap between the polycarbonate sheet 214, the base ring assembly 211 and the external cylinder assembly 210 and the second locking device is configured to lock air gap between the polycarbonate sheet 214 and the guide rail pillar 213;

a seal assembly 100 adapted to fit over a top portion of the elevator cabin 220, wherein the seal assembly 100 is configured to seal the elevator cabin 220 to reduce vibrations during upward and downward movement of the elevator cabin 220, wherein the seal assembly 100 comprises:

a rubber seal 106 configured to couple with a structural plate 108 of the elevator cabin 220 wherein the structural plate 108, comprises a bottom surface 110, a top surface 112, and an edge 114 for integrating the top surface 112 with the bottom surface 110, wherein the rubber seal 106 comprises a trapezoidal-shaped extruded bottom section and is configured to couple to a bottom surface 110 of the structural plate 108, wherein, the trapezoidal-shaped extruded bottom section is configured to merge with the polycarbonate sheet 214 of the elevator cabin 220 at a predetermined point, wherein the rubber seal 106 is covered by means of a first mild carpet positioned on the bottom surface 110 of the structural plate 108, and wherein the rubber seal 106 comprises a U-shaped section 116 comprising a diverging bottom section;

a round soft foam extrusion 120 with an L-shaped tail structure encompassed in between top surface 112 and the bottom surface 110, wherein the round soft foam extrusion 120 is covered by a second mild carpet placed on the top surface 112 of the structural plate 108, wherein the round soft foam extrusion 120 is extended circumferentially between adjacent the U-shaped section 116 of a plurality of U-shaped sections of a plurality of guide rail pillars 213 along the top edge of the structural plate 108 to avoid air leakage for smooth traveling of the elevator 200, and wherein round soft foam extrusion 120 is configured to partially merge with the polycarbonate sheet 214, an electronic control unit 215 located on top of the external cylinder assembly 210, wherein the electronic control unit 215 controls the movement of the elevator.

* * * * *